(12) United States Patent
Mawson et al.

(10) Patent No.: US 10,793,229 B2
(45) Date of Patent: Oct. 6, 2020

(54) MULTI-ANCHORING DEPTH CONTROL SYSTEM

(71) Applicant: Cutting Edge Innovations, LLC, Garnet Valley, PA (US)

(72) Inventors: William Mawson, Glen Mills, PA (US); Stephen V. Weigman, Garnet Valley, PA (US)

(73) Assignee: CUTTING EDGE INNOVATIONS, LLC, Garnet Valley, PA (US)

( * ) Notice: Subject to any disclaimer, the term of this patent is extended or adjusted under 35 U.S.C. 154(b) by 282 days.

(21) Appl. No.: 16/019,738

(22) Filed: Jun. 27, 2018

(65) Prior Publication Data

US 2018/0304971 A1    Oct. 25, 2018

Related U.S. Application Data

(63) Continuation of application No. 15/414,087, filed on Jan. 24, 2017, now Pat. No. 10,035,566.

(60) Provisional application No. 62/407,245, filed on Oct. 12, 2016.

(51) Int. Cl.
*B63B 21/22* (2006.01)
*G05D 1/02* (2020.01)

(52) U.S. Cl.
CPC .......... *B63B 21/22* (2013.01); *G05D 1/0208* (2013.01); *B63B 2201/18* (2013.01); *B63B 2213/02* (2013.01)

(58) Field of Classification Search
CPC ............................. B63B 21/22; G05D 1/0208
See application file for complete search history.

(56) References Cited

U.S. PATENT DOCUMENTS

| | | |
|---|---|---|
| 3,386,407 A | 6/1968 | Mount |
| 4,090,462 A | 5/1978 | Mount |
| 4,727,819 A | 3/1988 | Pollack |
| 4,808,133 A | 2/1989 | Gram et al. |
| 5,491,636 A | 2/1996 | Robertson et al. |
| 5,816,182 A | 10/1998 | Pollack |
| 6,132,144 A | 10/2000 | Zueck et al. |
| 6,227,136 B1 | 5/2001 | Shapiro |
| 6,295,944 B1 | 10/2001 | Lovett |
| 6,678,589 B2 | 1/2004 | Robertson et al. |
| 9,211,939 B2 | 12/2015 | Torres et al. |
| 9,422,034 B2 | 8/2016 | Bauer et al. |
| 2009/0115622 A1* | 5/2009 | Michie .................... B63B 21/22 340/686.1 |
| 2015/0116496 A1* | 4/2015 | Ottaviano ............... B63B 21/26 348/148 |

FOREIGN PATENT DOCUMENTS

| | | |
|---|---|---|
| EP | 2524863 A1 | 11/2012 |
| WO | 2014/027210 A1 | 2/2014 |

* cited by examiner

*Primary Examiner* — Basil T. Jos
(74) *Attorney, Agent, or Firm* — Panitch Schwarze Belisario & Nadel LLP

(57) ABSTRACT

A multi-anchor depth control system for a boat or other watercraft having a line for securing anchors to the boat, at least two anchors attached at or near opposing ends of the line, a depth finder, and a controller configured to automatically adjust the amount of line released from the boat to maintain the anchors on the floor of the body of water in which the boat is floating, based upon information obtained from the depth finder.

18 Claims, 5 Drawing Sheets

MULTI-ANCHORING DEPTH CONTROL SYSTEM

CROSS-REFERENCE TO RELATED APPLICATIONS

The present application is a continuation of U.S. patent application Ser. No. 15/414,087, filed on Jan. 24, 2017 and titled "Multi-Anchoring Depth Control System," which claims the benefit of U.S. Provisional Patent Application No. 62/407,245, filed on Oct. 12, 2016 and titled "Dual Anchoring Depth Control System," the entire contents of which are incorporated herein by reference in their entirety.

BACKGROUND OF THE INVENTION

Boat anchoring systems are generally known. Existing boat anchors are generally single anchors which must be manually set to a desired depth. As tides and other water conditions change or a storm approaches, traditional boat anchors must be monitored and adjusted to ensure the correct amount of anchor line is let out and to retain the boat in a desired location or at a desired depth. Such adjustments require relatively constant attention to a boat. A need therefore exists for an anchoring system which can be programmed to maintain the boat and anchor in a desired location or at a desired depth and automatically adjust the length of the anchor line accordingly.

BRIEF SUMMARY OF THE INVENTION

One aspect of the present invention is directed to a multi-anchor depth control system for a boat or other watercraft having a line for securing anchors to the boat, at least two anchors attached at or near opposing ends of the line, a depth finder, and a controller configured to automatically adjust the amount of line released from the boat to maintain the anchors on the floor of the body of water in which the boat is floating, based upon information obtained from the depth finder.

A second aspect of the present invention is directed to A multi-anchor depth control system for a boat or other watercraft having first and second lines for securing anchors to the boat, a first anchor attached at or near an end of the first line, a second anchor attached at or near an end of the second line, a depth finder, and a controller configured to automatically adjust the amount of the first and second lines extending from the boat to maintain the anchors on the floor of the body of water in which the boat is floating, based upon information obtained from the depth finder.

A third aspect of the present invention is directed to a multi-anchor depth control system for a boat or other watercraft having first and second lines for securing anchors to the boat, a first anchor attached at or near an end of the first line, a second anchor attached at or near an end of the second line, a depth finder, a GPS receiver, and a controller configured to automatically navigate the boat to a location specified by the GPS receiver, release the first and second anchors from the boat, and automatically adjust the amount of the first and second lines extending from the boat to place the anchors on the floor of the body of water in which the boat is floating, based upon information obtained from the depth finder.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
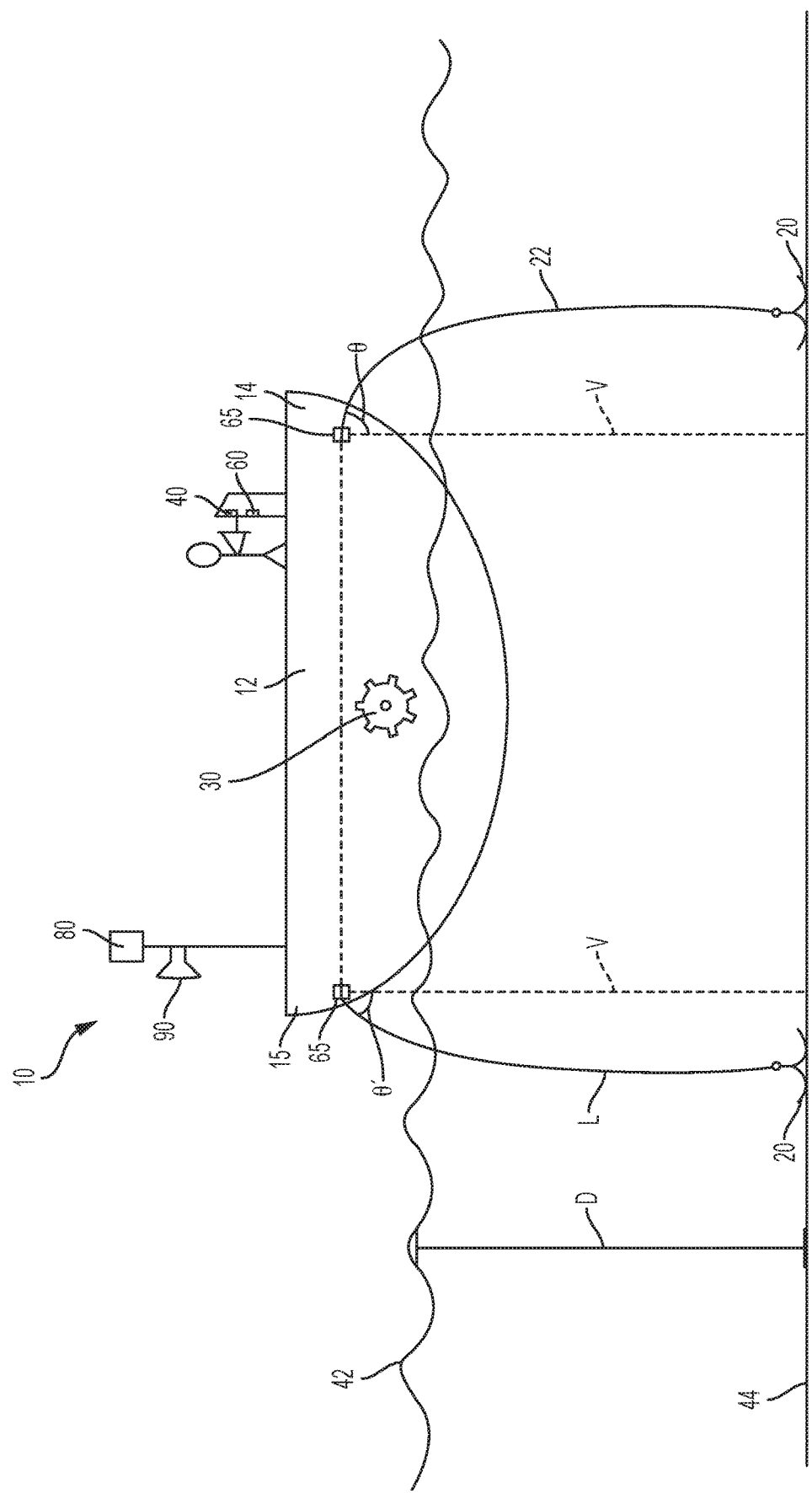
FIG. 1 is a side perspective view of a multi-anchor depth control system in accordance with a preferred embodiment of the present invention.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and related parts thereof. The terminology includes the above-listed words, derivatives thereof and words of similar import.

Figure 2:
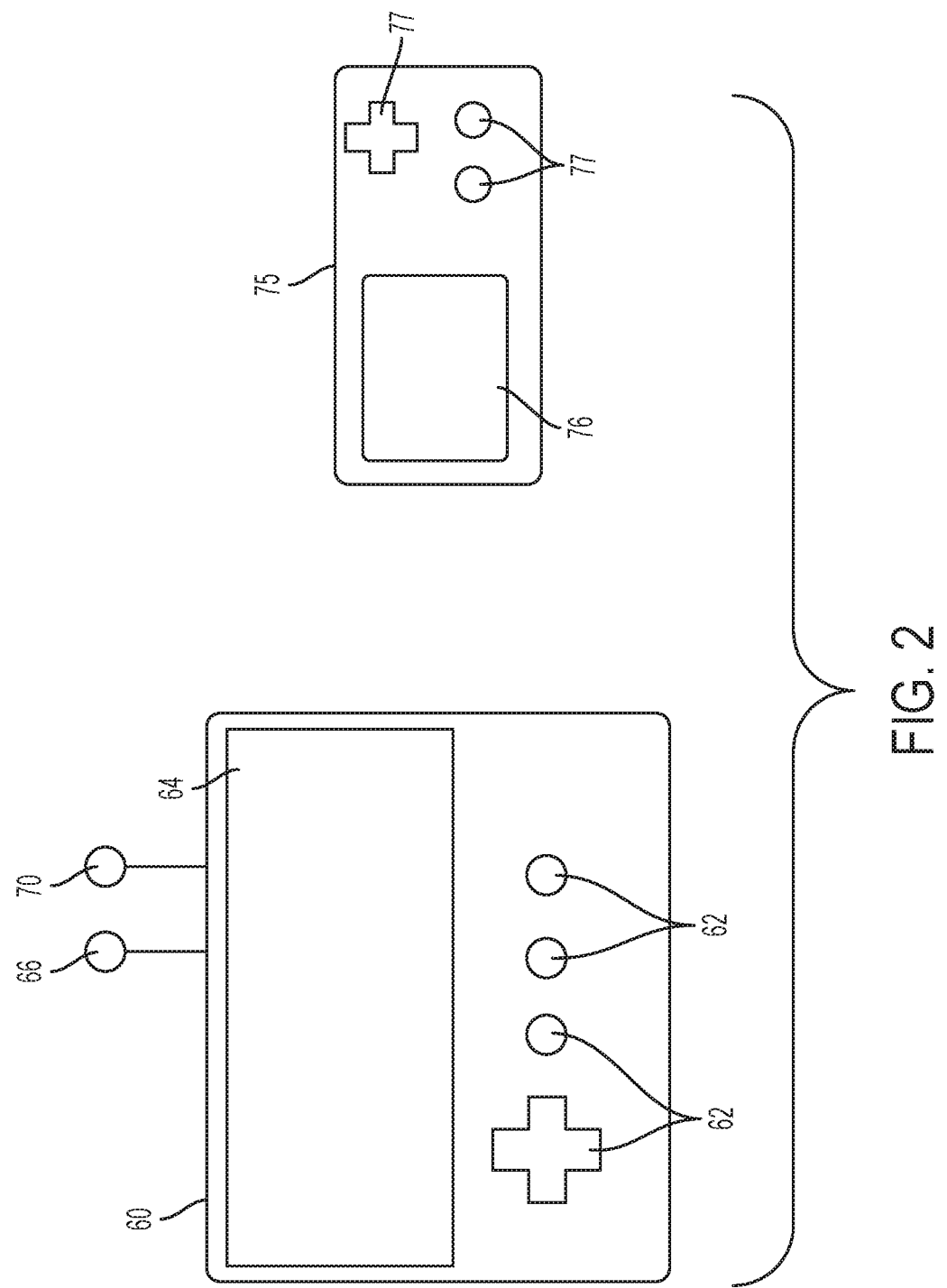
FIG. 2 is a front perspective view of a controller and a remote controller of the depth control system of FIG. 1.

Referring to FIGS. 1 and 2, wherein like numerals indicate like elements throughout, a first preferred embodiment of a multi anchoring depth control system 10 is shown, including a boat 12. The first preferred embodiment of the depth control system 10 preferably includes two anchors 20 connected to the boat 12 by a single line or cable 22, wherein the dashed line represents a portion of the line 22 preferably running within the boat 12. In the first preferred embodiment, one of the anchors 20 extends from the bow 14 of the boat 12 and another anchor 20 extends from the stern 15 of the boat 12. Each anchor 20 and the line 22 are preferably controlled by a motor 30 capable of raising or lowering the anchors 20 by releasing or retracting the line 22.

The first preferred embodiment of the depth control system 10 can include a single motor 30 which the line 22. The depth control system 10 also preferably includes a depth finder 40 mounted in the boat 12 to determine the depth D of the water beneath the boat 12 from the water surface 42 to the floor 44 of the ocean, lake, river, or sea. The depth finder 40 can be a commercially available product such as those manufactured by GARMIN (GARMIN is a registered trade mark to Garmin Switzerland GmbH), HUMMINBIRD (HUMMINBIRD is a registered trade mark to Johnson Outdoors Marine Electronics, Inc.), and the like. The depth finder 40 preferably conducts measurements by SONAR, but is not so limited. The depth control system 10 preferably includes a light source 80 and a speaker 90 that are preferably configured to light or emit a sound when the length of the line 22 is automatically adjusted, as described below.

Referring to FIG. 2, the depth control system 10 preferably further includes a computerized controller 60 for managing the system 10. The controller 60 preferably includes keys or buttons 62 and/or a screen 64. The screen 64 is preferably touch-sensitive. The controller 60 constantly or at predetermined and optionally customizable intervals monitors the depth of the anchors 20 and of the water under the boat 12 in connection with the depth finder 40. The depth control system 10 preferably further includes a sensor 65 capable of measuring the angles θ and θ' of the lines 22 in relation to a vertical plane V. The sensor 65 is preferably also capable of detecting the tension or vibration of the lines 22. In an alternate embodiment, the controller 60 is capable of calculating the angle θ based upon the depth D measured by the depth finder 40 and the length L of line 22 that has been released by the motor 30 based upon the formula $\cos(\theta)=D/L$. The depth control system 10 further includes a GPS receiver 70 in communication with the controller 60. The controller 60 preferably includes a wireless receiver 66 for remote communication with the controller 60, such as by cellular data network in communication with a user's cellular phone, tablet device, or a dedicated remote controller 75, which can further include a screen 76 and/or buttons 77. The cellular phone, tablet device, or dedicated remote controller 75 are preferably configured to transmit a set of GPS coordinates to the controller 60.

Figure 3:
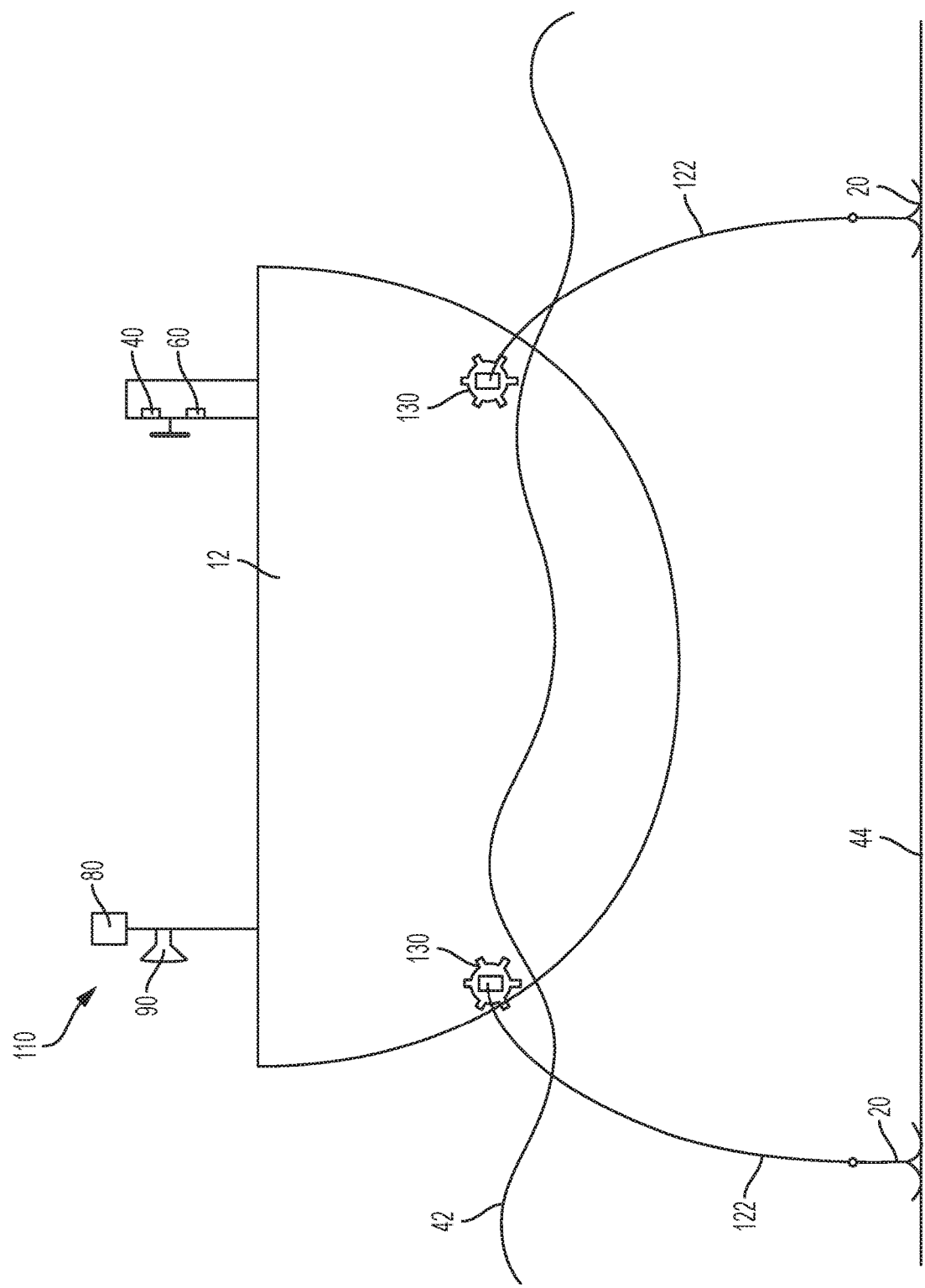
FIG. 3 is a side perspective view of a multi-anchor depth control system in accordance with a second preferred embodiment of the present invention.

Referring to FIG. 3, a second preferred embodiment of the multi anchoring depth control system 110 is shown. The second preferred embodiment includes a boat 12 and at least two anchors 20. The anchors 20 are each connected to the boat 12 by their own dedicated line or cable 122. Each anchor 20 and cable 122 pairing is preferably controlled by its own dedicated motor 130 capable of raising or lowering the anchors 20 by releasing or retracting each line 122 independently of the amount of line 122 released or retracted by any other motor 130. The second preferred embodiment of the depth control system 110 preferably also includes a depth finder 40 and is preferably paired with the controller 60 shown in FIG. 2 and described above.

Figure 4:
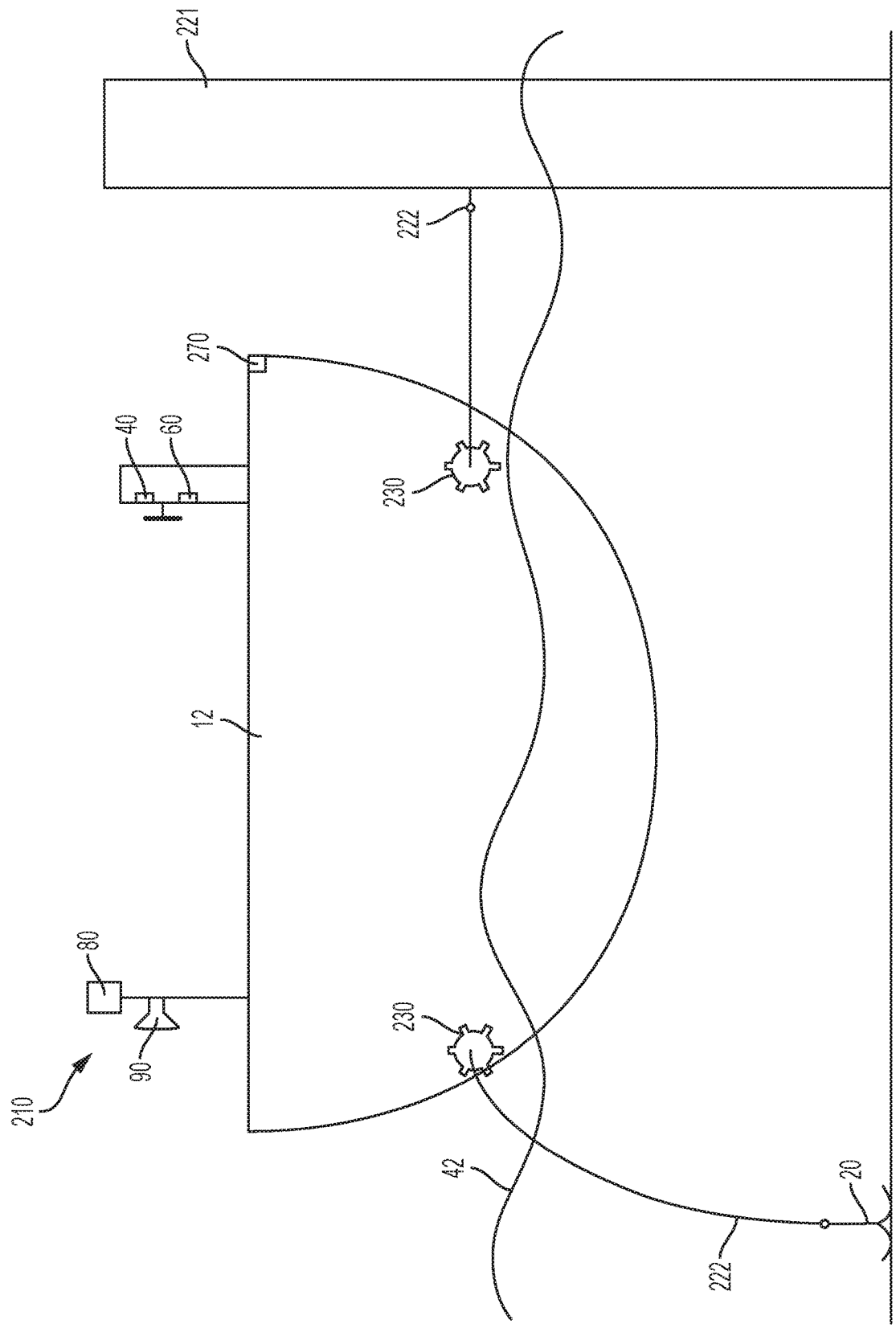
FIG. 4 is a side perspective view of a multi-anchor depth control system in accordance with a third preferred embodiment of the present invention.

Referring to FIG. 4, a third preferred embodiment of the multi anchoring depth control system 210 is shown. The third preferred embodiment includes a boat 12, an anchor 20, and a fastener 220. The anchor 20 and fastener 220 are each connected to the boat 12 by their own dedicated line or cable 222. As shown, the fastener 220 is connected to a fixed object in the water, such as a piling, dock, buoy, moor, or the like, indicated as 221. Each line 22 is preferably controlled by a dedicated motor 230 capable of releasing or retracting the amount of line 222 needed to maintain the boat 12 at a consistent depth and/or distance from the piling 221, in the manner described above. The depth control system 210 may also include a radar detector 270 for us in measuring the distance between the boat 12 and the piling 221. The third preferred embodiment of the depth control system 210 preferably also includes a depth finder 40 and is preferably paired with the controller 60 shown in FIG. 2 and described above. The depth control system 210 is not limited to the one-anchor 20 and one-fastener 220 configuration as shown, but may be configured to include two or more fasteners 220 for use with or without one or more anchors 20.

In use, a user can program the controller 60 to maintain the boat 12 at a desired depth, such as in twelve (12) feet of water, either through the buttons 62, the preferably touch-sensitive screen 64, or through his or her cellular phone, tablet, or remote controller 75. Alternately, the user can program the controller 60 to retain the boat 12 at a specific location using the GPS receiver 70. Upon the selection of a desired depth or location, if the boat 12 is not already located at the desired location or depth, the controller 60 commands the motor 30 to retract the line 22 or lines 122 to lift the anchors 20 from the floor 44 of the body of water. The controller 60 then commands the engines (not shown) of the boat 12 to adjust the position of the boat 12 so that it is relocated to the desired location. Upon reaching the desired location, or if the boat 12 was already at the desired location or depth, the controller 60 communicated with the depth finder 40 to determine the depth of the water and commands the motor 30 to release an appropriate amount of line 22 or lines 122 to place the anchors 20 on the floor 44 of the body of water to hold the boat 12 in place. While the anchors are released, the depth finder 40 continually or periodically, such as once per second or once per minute, measures the depth of the water and communicates that information to the controller 60. Upon receiving the depth of the water from the depth finder 40, if the controller 60 determines that an adjustment to the length of line 22 or lines 122 is necessary, the controller 60 causes the light source 80 and/or speaker 90 to emit a light and/or sound to alert those nearby the boat 12 that an automatic adjustment will soon take place. The emitted light or sound can be any type suitable to alert those around the boat 12 that it will be moving, such as a solid or blinking light or a buzzing or beeping sound. The light source 80 can alternately be configured to illuminate all or part of the area around the boat 12 before an automatic adjustment takes place, preferably in conjunction with a light detecting sensor (not shown) configured to adjust the brightness of the light source 80 based upon the amount of ambient light. The controller 60 further sends a communication signal to the cellular phone, tablet, or remote controller 75 containing a notification to the user that the automatic adjustment of the boat 12 will soon begin. The controller 60 then recalculates the appropriate amount of line 22 or lines 122 that is/are released and commands the motor 30 or motors 130 to release or retract more line 22 or lines 122 as necessary to maintain the boat 12 at a correct depth or location.

If the depth finder 40 is configured to monitor the water depth continually or with enough frequency, the controller 60 is configured to calculate the depth of passing waves based upon short-term fluctuations in the depth as measured by the depth finder 40. When the depth of passing waves reaches a sufficiently high level, the controller 60 preferably automatically adjusts the amount of line 22 or lines 122 that is/are released to properly account for storm conditions with larger waves, thereby automatically retaining the boat 12 at a safe depth and location without additional intervention by a user. When the user wishes to move the boat 12, he or she can instruct the controller 60 to retract the anchors 20.

Figure 5:
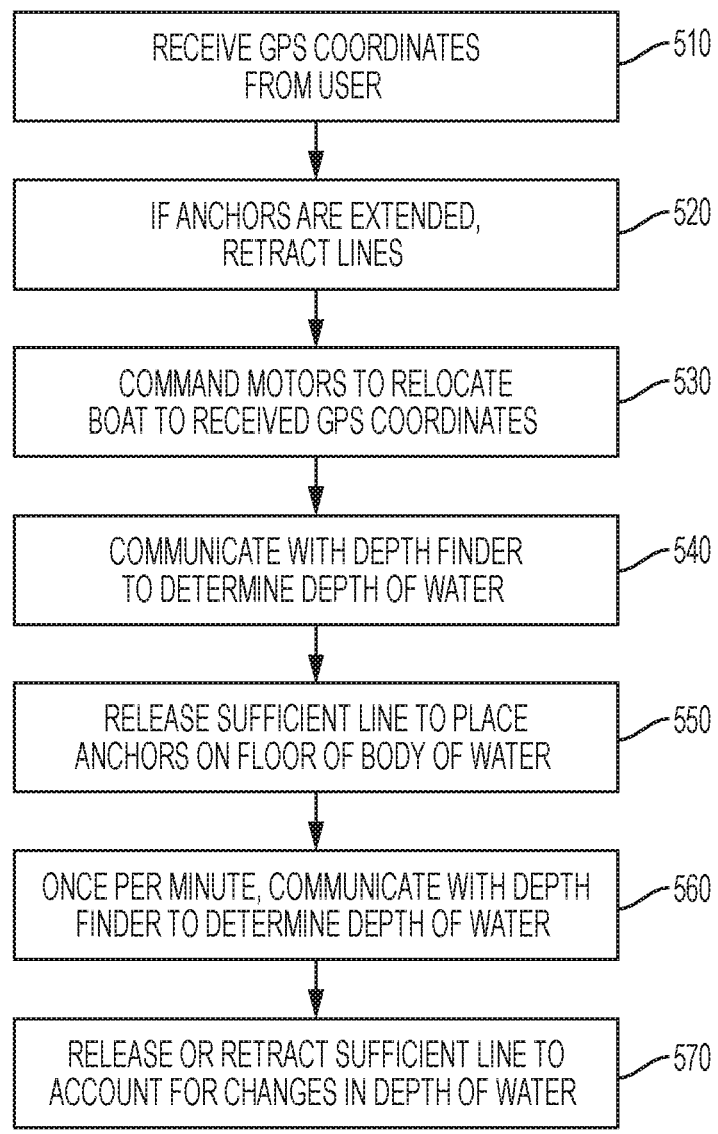
FIG. 5 is a flow diagram detailing the operation of the multi-anchor depth control system of FIGS. 1-4.

Another example of the use of the depth control system 10, 110, 210 is shown in FIG. 5. At step 510, the user uses his or her cellular phone, tablet device, or dedicated remote controller 75 to send a desired location for the boat 12 to the controller 60 as a set of GPS coordinates. At step 520, the controller 60 communicates with the sensor 65 to determine whether the anchors 20 are extended and, if so, commands the motors 30 to retract the anchors 20. Next, at step 530, the controller 60 commands the motors (not shown) of the boat 12 to adjust the position of the boat 12 so that the boat 12 is moved to the GPS coordinates designated by the user. At step 540, the controller 60 communicates with the depth finder 40 to determine the depth of the water. At step 550, the controller 60 uses the depth determined by the depth finder 40 to command the motors 30 to release the correct amount of line 22 to place each anchor 20 on the floor 44 of the body of water. After the anchors 20 reach the floor 44, at step 560, the controller 60 communicates with the depth finder 40 to measure the depth of the water. At step 570, the controller 60 calculates whether the depth of the water has changed since the previous measurement, and if so, releases or retracts the appropriate amount of line 22 to maintain the boat 12 in place and the anchors 20 on the floor 44 as the depth changes.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure. For example, while the embodiments described herein are shown in the Figures as having two anchors, the present invention can include three or more anchors without deviating from the inventive concept.

We claim:

1. A multi-anchor depth control system for a boat or other watercraft comprising a controller configured to:
   accept a desired depth input from a user;
   receive depth information from a depth finder;
   command the boat or other watercraft to navigate to a location having the desired depth input by the user based upon the depth information received from the depth finder; and
   command a motor to release at least two anchors of the boat or other watercraft to a floor of a body of water based on the depth information received from the depth finder.

2. The system of claim 1, wherein the controller is further configured to periodically or continuously receive further depth information from the depth finder and command the motor to adjust the depth of the anchors based upon the further depth information.

3. The system of claim 2, further comprising a light source, wherein the controller is further configured to actuate the light source before or concurrent to adjusting the depth of the anchors.

4. The system of claim 2, further comprising a speaker, wherein the controller is further configured to cause the speaker to emit an audible alert before or concurrent to adjusting the depth of the anchors.

5. The system of claim 2, further comprising a remote controller, wherein the controller is further configured to send a communication signal to the remote controller to notify the user that the depth of the anchors is being adjusted.

6. The system of claim 5, wherein the remote controller is one of a mobile phone or a tablet computer.

7. The system of claim 2, wherein the controller is further configured to utilize the further depth information to calculate the depth of passing waves and, where the calculated depth of passing waves exceeds a predetermined limit, command the motor to adjust the depth of the anchors based on the calculated depth of the passing waves.

8. The system of claim 1, further comprising a remote controller, wherein the remote controller is configured to accept the desired depth input from the user and send a communication signal to the controller containing the desired depth.

9. The system of claim 1, further comprising a sensor configured to determine whether the anchors are extended from the boat or other watercraft.

10. The system of claim 9, wherein the controller is further configured to retract the anchors prior to navigating the boat or watercraft to the location having the desired depth if the sensor determines the anchors are extended.

11. A multi-anchor depth control system for a boat or other watercraft comprising a controller configured to:
   accept desired location information;
   receive an anchor communication signal to determine whether anchors of the boat or other watercraft are extended and, if so, command a motor to retract the anchors;
   command the boat or other watercraft to navigate to a location matching the desired location information;
   receive depth information from a depth finder; and
   command the motor to release the anchors of the boat or other watercraft to a floor of a body of water based on the depth information received from the depth finder.

12. The system of claim 11, wherein the controller is further configured to periodically or continuously receive further depth information from the depth finder and command the motor to adjust the depth of the anchors based upon the further depth information.

13. The system of claim 12, wherein the controller is further configured to utilize the further depth information to calculate the depth of passing waves and, where the calculated depth of passing waves exceeds a predetermined limit, command the motor to adjust the depth of the anchors based on the calculated depth of the passing waves.

14. The system of claim 11, wherein the desired location information is in the form of GPS coordinates.

15. The system of claim 11, further comprising a remote controller, wherein the remote controller is configured to accept the desired location information from a user and send a location communication signal to the controller containing the desired location information.

16. The system of claim 15, wherein the remote controller is one of a mobile phone or a tablet computer.

17. The system of claim 11, further comprising a light source, wherein the controller is further configured to actuate the light source before or concurrent to commanding the boat or other watercraft to navigate to the location matching the desired location information.

18. The system of claim 11, further comprising a speaker, wherein the controller is further configured to cause the speaker to emit an audible alert before or concurrent to commanding the boat or other watercraft to navigate to the location matching the desired location information.

* * * * *